Patented May 31, 1932

1,860,681

UNITED STATES PATENT OFFICE

MARTIN LUTHER, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

POLYMERIZATION PRODUCTS OF DIOLEFINES

No Drawing. Application filed May 13, 1929, Serial No. 364,315, and in Germany July 17, 1928.

This invention relates to improvements in the manufacture and production of plastic or elastic polymerization products of diolefines.

We have found that improved plastic and elastic polymerization products, which, when vulcanized, yield vulcanizates resembling the products obtained by the vulcanization of crude rubber, are obtained when agents having a reducing action are allowed to act on emulsions of the polymerization products obtained from diolefines such as butadiene, isoprene or dimethyl-butadiene, or agents having a reducing or otherwise decomposing action on oxidizing agents, in particular hydrogen peroxide, in case such oxidizing agents have been employed as polymerizers. Sodium bisulphite, sodium hydrosulphite, formaldehyde sodium sulphoxylate, stannous chloride, hydroxylamine or hydrazine or salts thereof, or hydrogen in the presence of catalysts are all suitable, among others, as reducing agents for the purpose of the present invention, and phenols, naphthols, sols of metals or metal oxides, peroxidases and amines, such as aniline, may be mentioned as examples of agents facilitating the decomposition of oxidizing agents. The mechanical treatment referred to may, for example, be a treatment of the polymerized product on friction rollers.

By the treatment in accordance with the present invention although the polymerization products themselves are not attacked, they are usually bleached to a marked extent, and are obtained with pale yellow to white colorations. With polymerization products, which have been prepared with the aid of agents supplying oxygen, such as peroxides and the like, another valuable action occurs besides the bleaching action, since the agents supplying oxygen which are still present in the product are destroyed, and thus an extensive stabilization of the product is effected. In particular, the action of the hydrogen peroxide, or other oxidizing agents, which agents are frequently employed in the polymerization, and small quantities of which always remain in the final product, is immediately counteracted by the action of the reducing agents. The known substances, which facilitate the decomposition of oxidizing agents, such as hydrogen peroxide, for example phenols, naphthols, amines, such as aniline, sols of metals or metal oxides, may also be employed in these cases in order to destroy the oxidizing agent and to increase the stability of the rubber, in place of or in addition to the said reducing agents.

The process may be carried out at ordinary or elevated temperature.

Additions of comparatively small amounts of the said reducing agents will be sufficient, for example, up to about 5 per cent by weight of the polymerization product. The amount can easily be controlled, since no considerable excess of the reducing agent should finally be present. The agents facilitating the decomposition of oxidizing agents may even be employed in very small amounts indeed.

The following example will further illustrate how the invention may be carried out in practice, but the invention is not restricted thereto. The parts are by volume.

Example 18 parts of olein are dissolved in 200 parts of isoprene, and the solution is emulsified by shaking in 350 parts of an 0.5 per cent aqueous solution of ammonia to which 0.5 per cent of glue is added as a protective colloid. The hydrogen-ion concentration of the emulsion amounts to 8.9. It is a stable emulsion, and by adding 5 parts of 30 per cent hydrogen peroxide and heating for two days at 50° C. a product, containing the polymerization product in dispersion in the manner that rubber is contained in latex, is obtained. 30 parts of a 10 per cent aqueous sodium hydrosulphite solution are then added to the product. The hydrogen peroxide still present is thus destroyed and by precipitation in the usual manner a white polymerization product is obtained which has good properties, in particular good stability.

By employing 50 parts of an 0.5 per cent solution of phenol or aniline in water instead of the sodium hydrosulphite solution, a stable polymerization product is similarly obtained, which, however, is somewhat darker in color.

What we claim is:—

1. In the production of plastic or elastic products from products obtained by the polymerization of diolefines in the presence of hydrogen peroxide, the step of allowing a substance effecting decomposition of hydrogen peroxide to act on an emulsion of the said products.

2. In the production of plastic or elastic products from polymerization products of diolefines, the step of allowing to act on an emulsion of the said products up to about 5 per cent, by weight of the polymerization product, of sodium hydro-sulphite solution.

3. In the production of plastic or elastic products from products obtained by the polymerization of diolefines in the presence of an oxidizing agent, the step of allowing to act on an emulsion of the said products up to about 5 per cent, by weight of the polymerization product, of sodium hydrosulphite solution.

4. In the production of plastic or elastic products from products obtained by the polymerization of butadiene in the presence of hydrogen peroxide, the step of allowing to act on an emulsion of the said products up to about 5 per cent, by weight of the polymerization product, of sodium hydrosulphite solution.

5. In the production of plastic or elastic products from products obtained by the polymerization of diolefines in the presence of hydrogen peroxide, the step of allowing sodium hydrosulphite to act an an emulsion of the said products.

6. In the production of plastic or elastic products from products obtained by the polymerization of diolefines in the presence of hydrogen peroxide, the step of allowing sodium bisulphite to act on an emulsion of the said products.

7. In the production of plastic or elastic products from products obtained by the polymerization of diolefines in the presence of hydrogen peroxide, the step of allowing stannous chloride to act on an emulsion of the said products.

In testimony whereof we have hereunto set our hands.

MARTIN LUTHER.
CLAUS HEUCK.